No. 655,489. Patented Aug. 7, 1900.
O. HOFF.
PIVOTAL BEARING FOR TURN TABLES.
(Application filed Apr. 23, 1900.)

(No Model.) 2 Sheets—Sheet 1.

Witnesses
Robert Otto
Harry Kilgore

Inventor
Olaf Hoff.
By his Attorneys.
Williamson & Merchant

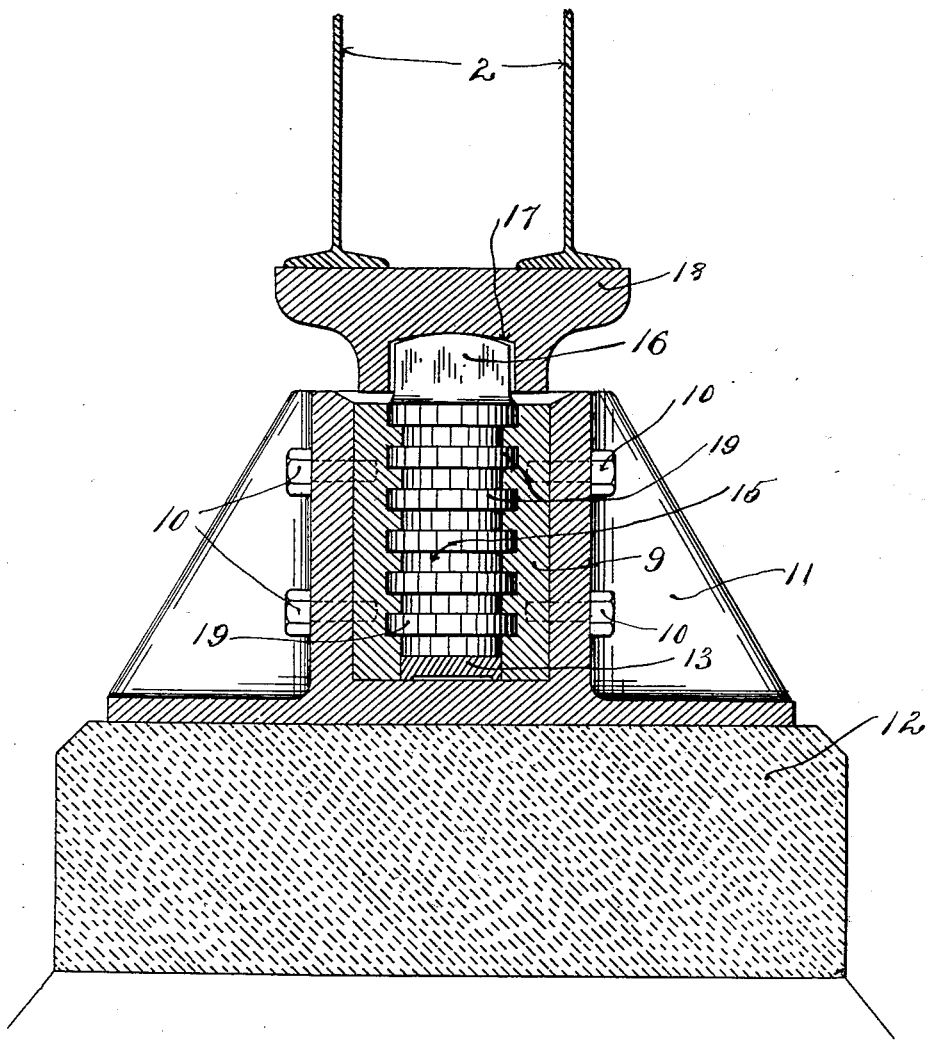

UNITED STATES PATENT OFFICE.

OLAF HOFF, OF MINNEAPOLIS, MINNESOTA.

PIVOTAL BEARING FOR TURN-TABLES.

SPECIFICATION forming part of Letters Patent No. 655,489, dated August 7, 1900.

Application filed April 23, 1900. Serial No. 13,849. (No model.)

*To all whom it may concern:*

Be it known that I, OLAF HOFF, a citizen of the United States, residing at Minneapolis, in the county of Hennepin and State of Minnesota, have invented certain new and useful Improvements in Pivotal Bearings for Turn-Tables; and I do hereby declare the following to be a full, clear, and exact description of the invention, such as will enable others skilled in the art to which it appertains to make and use the same.

My present invention has for its object to provide an improved pivot or center bearing for locomotive turn-tables, swinging bridges, heavy cranes, and derricks, and such devices which swing in horizontal planes and wherein the bearings are called upon to sustain very heavy loads.

To the above ends the invention consists of the novel devices and combinations of devices hereinafter described, and defined in the claims.

It is a well-known fact that such pivotal bearings—for instance, those used in locomotive-turning tables—are unsatisfactory, for the following reasons: To prevent the abrasion or grinding of the sliding surfaces of the pivot under the heavy loads put upon them, they are necessarily extended over a considerable area to reduce the pressure per square inch thereon, and in prior constructions to obtain the necessary area of bearing-surface such surfaces have been extended outward from the axis of the bearing to such an extent that the increasing leverage of the frictional resistance has made the pivot very difficult to turn when under load strains. I have overcome this defect in my present invention by providing the pivot-shaft or pintle with a plurality of bearing-surfaces, which instead of being extended radially outward from the axis of the pivot are kept near to the axis thereof and extended in different horizontal planes one over the other.

The invention is illustrated in the accompanying drawings, wherein like characters indicate like parts throughout the several views.

Figure 1:
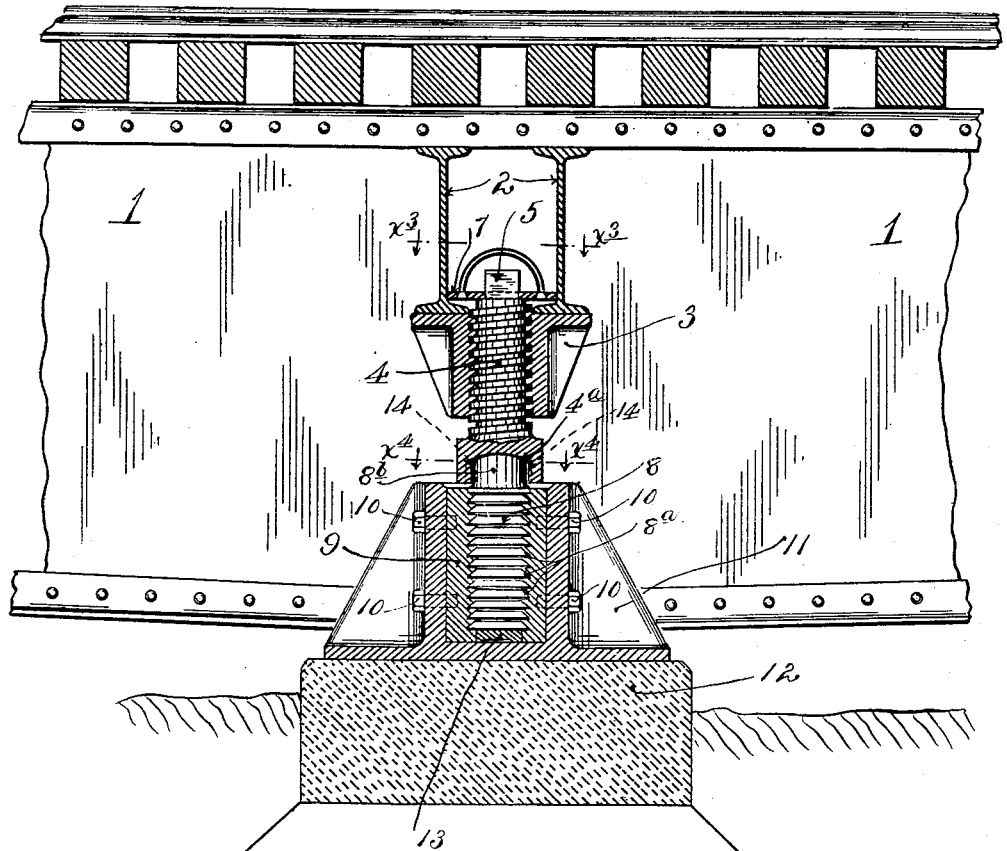
Figure 4:
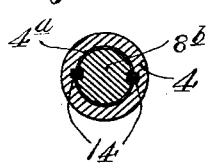
Figure 3:
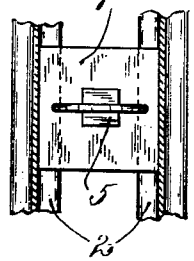
Figure 2:
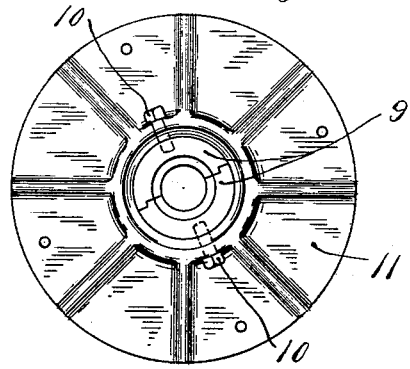

Figure 1 is a longitudinal vertical section taken through a portion of a locomotive turn-table equipped with one of my improved center-bearing pivots. Fig. 2 is a plan view of the pedestal or bearing casting. Fig. 3 is a detail in horizontal section on the line $x^3\ x^3$ of Fig. 1, some parts being broken away. Fig. 4 is a horizontal section on the line $x^4\ x^4$ of Fig. 1; and Fig. 5 is a vertical section corresponding to Fig. 1, but illustrating a modified construction, some parts being broken away.

The trussed body of the turn-table is indicated as an entirety by the numeral 1 and at its central portion is shown as provided with a pair of transverse and parallel I-beams 2, to which in the construction illustrated in Fig. 1 an internally-threaded casting 3 is rigidly secured in the ordinary way. The heavy screw-threaded stem 4 of the center-bearing shaft or pintle 4 works with screw-threaded engagement through the casting 3, the same, as shown, being provided at its upper end with a squared shank 5, with which and the I-beams 2 a rectangular lock-plate 7 coöperates to hold the stem 4 against rotation with respect to the casting 3.

The construction so far described is ordinary, and the purpose of the screw-threaded engagement between the stem 4 and casting 3 is to afford means for vertically adjusting the turn-table to its proper altitude.

In accordance with my invention the lower section 8 of the pintle or pivot-shaft is formed with a series of bearing-surfaces located one over the other and formed by cutting on the surface of the said shaft a series of projecting ledges or annular bearing-surfaces that extend in horizontal planes or in planes at right angles to the axis of the pivot. The annular bearing-surfaces are preferably formed by cutting in the shaft a series of V-shaped grooves, leaving correspondingly-formed series of projecting bearing-flanges $8^a$.

The bearing-flanges $8^a$ fit in correspondingly-formed seats cut within a bearing-bushing 9, which in turn is secured against rotation by set-screws 10 or other means in a suitable seat formed within the pedestal-casting 11, which pedestal-casting is shown as supported by a stone or concrete foundation 12.

The bearing-surfaces of the pintle or pivot-shaft must not be spiral, for the reason that the turn-table must not be raised and lowered as it is turned, and hence the said shaft cannot be screwed into the bearing-bushing 9. For this reason the said bushing is made of halves or sections, as shown in Fig. 2. The lower end of the shaft 8 rests upon the bottom of the bushing 9, which bottom, as shown, is in the form of a plug or heavy disk 13, that directly rests upon the bottom of the pedestal-casting 11. This plug or supplemental bottom 13 receives a considerable portion of the load put upon the pintle, and hence reduces materially the strain put upon the annular bearing-flanges 8ª in the one construction or 19 in the other construction. Furthermore, the bearing-contact between the pintle and the plug or bottom section 13 is confined quite closely to the immediate vicinity of the axis of the pintle. Hence it will be seen that all of the bearing-surfaces are distributed not far from the axis of the pintle, so that the friction of the pivot is thereby reduced to a minimum by keeping the frictional leverage as short as possible. It will be noted by reference to Figs. 1 and 5 that the bottom of the plug 13 is recessed. This throws the entire friction on the under surface of the plug outward from its center, and thus increases the frictional leverage of the bottom of the plug over that of the upper surface of the same, which insures said plug against turning within the pedestal.

In the construction illustrated in Fig. 1 the pintle or shaft sections 4 and 8 are caused to rotate together, but are otherwise flexibly connected, the section 4 being shown as formed with a socket 4ª and the section 8 with a shank 8ᵇ, the latter of which has a convex upper surface which engages the concave bottom of said socket. As shown, keys 14, carried by the shank 8ᵇ, loosely engage seats in the socket 4ª to cause the said parts to rotate together.

In bridge and turn-table construction the pivoted span or truss will of necessity be given more or less vertical oscillations, which if the pintle above described were formed rigid or inflexible or in but one section would cause binding of the annular bearing-surfaces of the pintle and the base. However, with the flexible joint 4ª 8ᵇ such binding action is obviated and the turn-table or span is permitted its free vertical oscillations or locking motions.

The device above described is capable of considerable modification within the scope of my invention. In Fig. 5 I have illustrated a modified construction in which the pintle or pivot-shaft 15 has a squared shank 16 at its upper end which engages directly a correspondingly-formed seat 17 of a casting 18, which in turn is directly secured to the I-beams 2. Also in this construction the bearing-ledges or annular flanges 19 of the pintle 15 are rectangular in cross-section, and the grooves or seats for the same in the bushing 9 are correspondingly formed. This construction of the bearing flanges or ledges is not, however, the full equivalent of the construction illustrated in Fig. 1 for the reason that with the beveled arrangement of the bearing-flanges a great deal more bearing-surface may be provided within a given length.

What I claim, and desire to secure by Letters Patent of the United States, is as follows:

1. A vertical pivot-bearing for turn-tables, bridges, &c., comprising a vertical pivot formed in sections connected by a flexible joint that causes them to rotate together, the lower pintle-section having peripheral annular bearing-surfaces, and a base or support having bearing-surfaces coöperating with the annular bearing-surfaces of said pintle, substantially as described.

2. A vertical pivot-bearing for turn-tables, bridges, &c., comprising a pintle having peripheral annular bearing-surfaces and a lower end bearing-surface, and a base or support receiving the lower portion of said pintle, having annular bearing-surfaces coöperating with the annular bearing-surfaces of said pintle, and provided with a bearing-surface at its bottom which engages the lower end of said pintle from its axis outward, substantially as described.

3. A vertical pivot-bearing for turn-tables, bridges, &c., comprising a pintle cut flat at its lower end and provided with peripheral annular bearing-flanges, and a base or support having annular flanges coöperating with the annular flanges of said pintle, and provided with a supplemental bottom or plug 13 recessed centrally at its under face, substantially as described.

In testimony whereof I affix my signature in presence of two witnesses.

OLAF HOFF.

Witnesses:
M. M. McGRORY,
F. D. MERCHANT.